July 11, 1939.  G. ZERKOWITZ  2,165,994
TURBINE FOR LOW TEMPERATURE GAS SEPARATION
Filed March 18, 1936  2 Sheets-Sheet 1
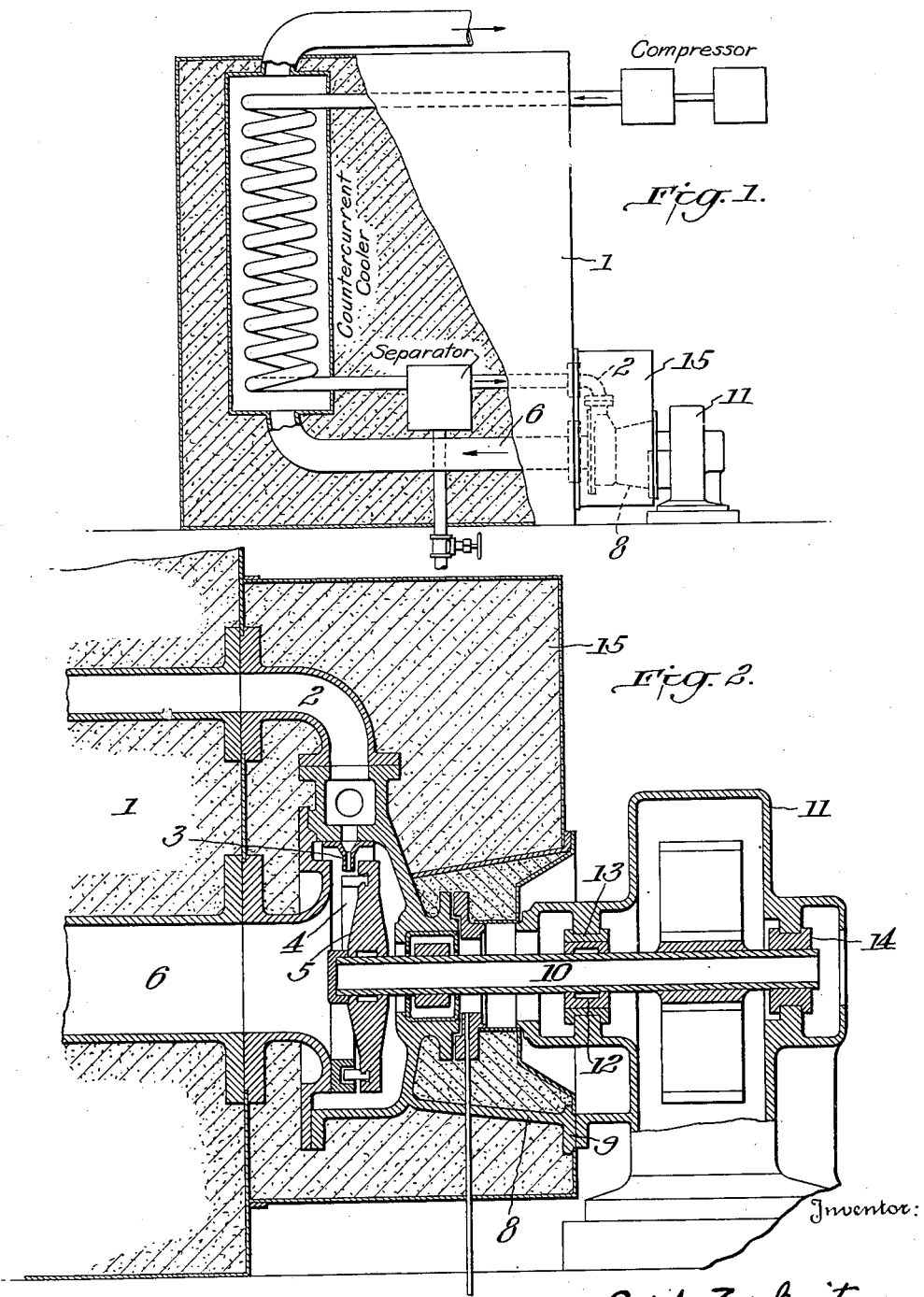
Inventor:
Guido Zerkowitz
By Potter, Pierce & Scheffler
Attorneys.

July 11, 1939. G. ZERKOWITZ 2,165,994
TURBINE FOR LOW TEMPERATURE GAS SEPARATION
Filed March 18, 1936 2 Sheets-Sheet 2
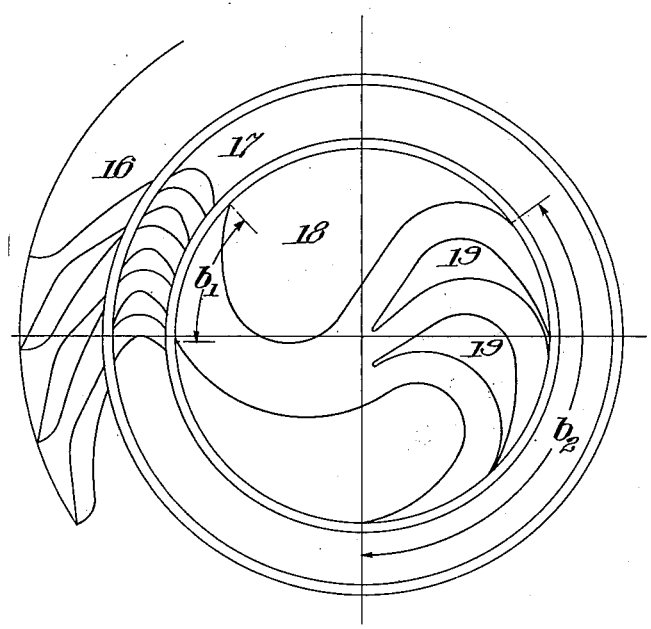
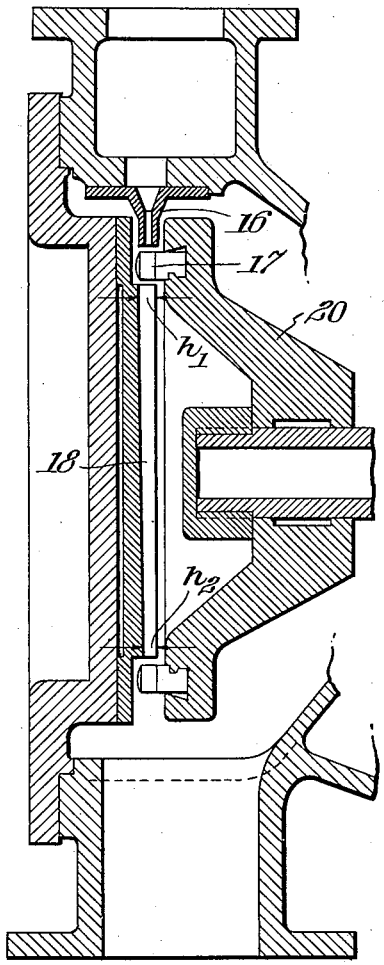
Inventor:
Guido Zerkowitz
By Potter, Pierce & Scheffler
Attorneys.

Patented July 11, 1939

2,165,994

UNITED STATES PATENT OFFICE 2,165,994

TURBINE FOR LOW TEMPERATURE GAS SEPARATION

Guido Zerkowitz, Trieste, Italy, assignor to Gesellschaft für Linde's Eismaschinen A. G., Hollriegelskreuth, near Munich, Germany Application March 18, 1936, Serial No. 69,543
In Germany March 24, 1933

11 Claims. (Cl. 62—123)

This invention relates to the separation of gases by fractional condensation and/or distillation at low temperatures and is particularly directed to apparatus including an improved form of turbine for expanding gases at low temperatures.

When air is separated by cooling it to low temperatures it is often of advantage to expand the air or the products of separation at low temperatures with the performance of external work. It has already been proposed to perform the expansion in a turbine. In practice, however, this method of operation has not yet been successful as the lowering of temperature that could be obtained was too small. The difficulties arise chiefly from the fact that the volume of gas to be expanded is relatively small, the more so as in most cases only a portion of the gas treated is to be expanded, and besides, the density of the gas to be expanded is higher at the low temperatures. Moreover, the heat drop which is available is generally small, which makes the losses in inlet and outlet pipes very important. It is, therefore, difficult to obtain a favorable internal efficiency in the expansion; furthermore, the absorption of heat from outside plays a considerable part. Through it the lowering of temperature is impaired in contrast to steam and gas turbines which work at high temperatures.

The present invention relates to apparatus for avoiding these disadvantages. According to my invention the gas is expanded in a high-speed turbine which consists of only one, or a few, stages and the moving blades of which are arranged on a rotor of small diameter.

The shaft bearings are entirely outside the housing of the turbine, for example, within the shell of the machine driven by the turbine, or of a gearing. The unilateral mounting of the rotor causes a considerable reduction of those losses of cold which are produced in the turbine by the conduction of heat from the bearing through the shaft to the cold gas expanded in the turbine. Furthermore, the housing or shell of the turbine is preferably not supported by itself, but is fixed to the shell of the driven machine or of the gearing. This is done in such a way that the surface contacts are reduced to a minimum which makes the heat absorbed by the turbine as small as possible. Altogether the heat-absorbing surface of the turbine shell is made very small, and heat insulation is effectively arranged on all sides and preferably combined with that of the separation apparatus.

The supply of the gas to be expanded from the separation apparatus to the turbine, the return flow of the expanded gas to the countercurrent cooler of the separation apparatus and the flow of the gas through those turbine parts which are not destined for power transmission, is effected at low velocity and with as few alterations of direction as possible in order to avoid losses of pressure.

The invention will be more particularly described with reference to the accompanying drawings, in which:

Fig. 1 is an elevation in partial section diagrammatically indicating the relation of the turbine of the invention in the gas separation system;

Fig. 2 is a sectional elevation of a turbine embodying the invention;

Fig. 3 is a diagrammatic representation showing the arrangement of blades and gas passages of a two-stage turbine embodying the invention; and Fig. 4 is a radial section through a turbine of the type represented in Fig. 3.

Referring to Figs. 1 and 2, 1 represents a separation apparatus of usual construction, 2 is the supply line to the turbine, 3 is the nozzle, 4 is the moving blade, 5 is the rotor wheel, 6 is the outlet conduit. In this case the direction of flow is radially inwardly. Of course, however, it is possible to provide the reverse direction of flow, i. e., to introduce the gas from the inside and lead it back to the countercurrent cooler on the outside. This arrangement is particularly advisable if several stages are provided. The inner diameter of the blade rim may, as a limiting case, be chosen so small that it exceeds only by very little the diameter of the outlet conduit 6. The bearings of the turbine shaft 10 are entirely within shell 11 of the gearing; 13 and 14 are the brasses of the two bearings. In order to keep the cold gases as far away as possible from the warm parts, the distance between the rotor wheel 5 and the brass nearest the turbine must not, as is usually done, be kept as small as possible, but it is, contrary to constructional dictates, purposely chosen much larger so that it is about equal to or even larger than the diameter of the turbine wheel. By this means the deflection of the shaft 10 is necessarily increased and accordingly the critical speed of the turbine is reduced. This disadvantage, however, may be overcome by using a material of small specific weight, e. g., duralumin, for the rotor 5 while for the shaft a material of high strength, preferably of low heat conductivity, is used. The material of the shaft must at the same time have a modulus of elasticity not smaller than about $1.5 \times 10^6$ at working temperature. For this purpose chromium nickel steels or nickel steels improved by temperng are suited. The rotor wheel and the blading may be made of light metals, especially aluminium or improved aluminium alloys, e. g., duralumin, which have a small specific weight and at the same time a high strength dependent only slightly on temperature. With this construction it is also possible, without exceeding the critical number of revolutions, to reach such high peripheral velocities that considerably more favorable conditions may be produced for the internal efficiency of the turbine than hitherto.

In order to keep the source of heat as far away from the rotating parts of the turbine as possible, the shaft 10 is preferably made hollow so that the heat conductive cross-section is diminished without essentially injuring the strength. Between the shaft 10 and the brass 13 preferably a channeled box 12 is provided. By channels in the nave of the rotor wheel 5 the heat transmission may also be reduced.

To confine the heat supply through the fixed parts, the shell of the turbine is connected with the shell 11 of the gearing preferably by a narrow channel shaped bracket 8 having an arcuate cross-section and the flange 9. The flange is also preferably channeled and a layer of insulation may be interposed between the faces thereof. It is also possible to provide lugs on the housing of the turbine which are secured to corresponding projections of the gearing shell most advantageously in the horizontal median plane. Also in this case a layer of insulation may be interposed.

The whole turbine, including inlet and outlet pipes, is entirely encased by insulation material 15, the thickness of which, especially on the side away from the separation apparatus, is as great as possible. This is made possible by the considerable distance between turbine and gearing shell. Owing to the high thermal insulation of the expanding gas the bearing of the shaft can, without losses of cold, be kept at considerably higher temperatures than the temperature of gas so that the usual lubrication materials may be used for the bearings.

The above description relates to a turbine with expansion in one stage. If several stages should be needed a single rotor wheel only is used in order to keep the outer dimensions of the turbine as small as possible. Therefore, either the stages are arranged radially, or velocity staging is applied by catching the gas as it leaves the blades in a reversing nozzle and once more conducting it to the moving blades. In this case the reversing nozzle is, according to the present invention, subdivided at the outlet side by intermediate blades in such a way that, although the total cross-sectional area of the flow passage through the reversing nozzle is only slightly increased at successive portions in the direction of flow, yet the degree or zone of admission at the second admission of the gas into the moving blades opposite the inlet into the reversing nozzle is considerably increased, even doubled or trebled. The free cross-section of the flow in the reversing nozzle is, therefore, adjusted according to the flow therethrough in such a way that eddies are avoided. On the other hand, the degree of admission to the moving blades at the second admission is adjusted to the diminished relative velocity. Thus it becomes possible to choose the angle of outlet in such a manner that the reflow of the gas takes place without losses by impact. This feature of the invention may be realized in axial turbines as well as in radial ones.

In Fig. 3, which shows an example of the invention embodied in a radial flow turbine, 16 is the first rim or guide blade disc in which the expansion of the gas takes place. The expansion may be complete, but a slightly higher clearance pressure is also admitted. 17 is the moving blade and 18 is the reversing nozzle. As can be seen from Fig. 3, the reversing nozzle is, on the inlet side, constructed in the usual way, the degree of admission being given by the length of curve $b_1$. On the outlet side the reversing nozzle is subdivided by the intermediate blades 19. Of course, instead of two intermediate blades, several or only one may be provided according to circumstances. The zone of admission at the reflow of the gas is $b_2$, being considerably greater than $b_1$.

Fig. 4 is a radial section through a turbine with reversing nozzle. To obtain conditions of flow as favorable as possible the height of the reversing nozzle is also made variable in such a way that it gradually decreases from $h_1$ to $h_2$. By this fact, too, the degree of admission $b_2$ is increased. If, as is the case in the present example, the reversing nozzle, because of the small diameter of the wheel, takes up a considerable portion of the space remaining within the moving blade, it is advisable to form the wheel 20 of conical shape so that the center of gravity of the wheel is spaced considerably in the axial direction from the center of gravity of the nave. Moreover, in this way the center of gravity of the wheel is moved toward the bearing, and the critical number of revolutions is increased without reducing the distance of the cold expanding gas from the warmer parts.

The reversing nozzle may also be used for repeated velocity staging if the dimension of the wheel permits. This is of special importance in case the ratio of the peripheral velocity to the discharge velocity is great, as then the relative velocity at the second passage through the moving blades is essentially smaller than at the first passage through the blades.

By the arrangements described above a considerable lowering of temperature of the gas is achieved during expansion in the turbine. It is emphasized that in order to obtain a lowering of temperature by the expansion it is not sufficient that the turbine has a good efficiency in the ordinary sense. The effective efficiency, including also the mechanical losses, is only of little importance for the separation of air, but, on the other hand, a high internal efficiency alone is not sufficient in the present case, for as can be seen, e. g., from an entropy diagram, the internal work of a turbine running at low temperatures is increased by heat supply from the environs, although the final temperature of the expansion is thereby increased. This, however, must be avoided in the present case; not only a high internal efficiency of the turbine, but also a perfect thermal insulation must be provided.

The new apparatus for expanding gases with external work may be operated with a cooling corresponding at least to that attainable in piston machines. The turbine is of particular importance for those air separation processes in which the air, or the products of separation, in order to compensate the losses of cold, are expanded at about the temperature of the liquid air only for some tenths of an atmosphere as there arise difficulties in working with piston machines under such conditions.

This application is a continuation-in-part of my application Serial No. 715,952, filed March 16, 1934.

I claim:

1. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in one stage at high velocity of the rotor and a shaft carrying said rotor, said shaft being hollow substantially thoughout its length and mounted in bearings, said bearings being substantially spaced from said rotor and mounted outside the housing of the turbine.

2. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in one stage at high velocity of the rotor, a shaft carrying said rotor, said shaft being mounted in bearings, said bearings being substantially spaced from said rotor and mounted outside the housing of the turbine and a thick layer of heat-insulating material interposed between the housing of the turbine and said bearings whereby heat flow from the bearings toward the housing is substantially prevented.

3. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in one stage at high velocity of the rotor and a shaft carrying said rotor, said shaft being hollow throughout its length and mounted in inwardly facing channeled bearings, said bearings being substantially spaced from said rotor and mounted outside the housing of the turbine.

4. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in one stage at high velocity of the rotor, and a shaft carrying said rotor, said shaft being hollow susbtantially throughout its length and mounted in bearings, all of which are outside the housing of the turbine, the distance between the rotor and the bearing nearest thereto being at least equal to the diameter of the rotor, and heat insulating means interposed between the housing of the turbine and the bearing nearest thereto.

5. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in one stage at high velocity of the rotor and a shaft carrying said rotor, said shaft being hollow substantially throughout its length and mounted in bearings, said bearings being substantially spaced from said rotor and mounted outside the housing of the turbine, the shaft consisting of high strength nickel steel having a modulus of elasticity not smaller than $1.5 \times 10^6$ at working temperature and the rotor and blading consisting of aluminum alloys.

6. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in a plurality of radial stages at high velocity of the rotor and a shaft carrying said rotor, said shaft being hollow substantially throughout its length and mounted in bearings, said bearings being substantially spaced from said rotor and mounted outside the housing of the turbine.

7. In apparatus for the separation of gases by liquefaction at low temperatures, a turbine for expanding compressed gas passing to a countercurrent cooler of the separation apparatus at low temperature with performance of external work and reduction in temperature of the gas comprising an overhung rotor of small diameter adapted for expanding the gases in a plurality of radial stages at high velocity of the rotor, the rotor being of conical shape with the point of the cone directed toward the supporting shaft of the rotor and a shaft carrying said rotor, said shaft being mounted in bearings, said bearings being substantially spaced from said rotor and mounted outside the housing of the turbine.

8. In apparatus for the separation of gases by liquefaction at low temperatures, a turbine for expanding compressed gas passing to a countercurrent cooler of the separation apparatus at low temperature with performance of external work and reduction of temperature of the gas comprising an overhung rotor of small diameter and a reversing nozzle for returning gases to the rotor, the zone of admission to the rotor at the outlet end of the reversing nozzle being considerably greater than the zone of admission at the inlet end thereof while the free cross-section of flow at the outlet end is at most only slightly greater than that at the inlet end.

9. In apparatus for the separation of gases by liquefaction at low temperatures, a turbine for expanding compressed gas passing to a countercurrent cooler of the separation apparatus at low temperature with performance of external work and reduction of temperature of the gas comprising an overhung rotor of small diameter and of conical shape with the point of the cone directed toward the supporting shaft of the rotor and a reversing nozzle for returning gases to the rotor, the zone of admission at the outlet end of the reversing nozzle being considerably greater than the zone of admission at the inlet end thereof while the free cross-section of flow at the outlet end is at most only slightly greater than that at the inlet end.

10. In apparatus for the separation of gases by liquefaction at low temperatures, a turbine for expanding compressed gas passing to a countercurrent cooler of the separation apparatus at low temperature with performance of external work and reduction of temperature of the gas comprising an overhung rotor of small diameter and a reversing nozzle for returning gases to the rotor, the zone of admission to the rotor at the outlet end of the reversing nozzle being considerably greater than the zone of admission at the inlet end thereof while the free cross-section of flow at the outlet end is at most only slightly greater than that at the inlet end and the height of the reversing nozzle diminishing constantly toward the outlet end thereof.

11. In an apparatus for the liquefaction of gases including expansion with external work, the combination of a driven member, a shell for said driven member, a bearing supported by said shell, a shaft journaled in said bearing, said shaft being hollow substantially throughout its length, a rotor carried by said shaft, and a housing for said rotor supported from said shell independently of said shaft and rotor and connected thereto by means retarding the flow of heat toward said housing, said bearing being outside said housing and heat insulating means interposed between said bearing and said housing.

GUIDO ZERKOWITZ.